United States Patent
Kurochkin et al.

(10) Patent No.: US 11,055,404 B2
(45) Date of Patent: Jul. 6, 2021

(54) ATTACK-RESISTANT QUANTUM RANDOM NUMBER GENERATOR BASED ON THE INTERFERENCE OF LASER PULSES WITH RANDOM PHASE

(71) Applicant: QRATE, LLC, Skolkovo (RU)

(72) Inventors: Vladimir Leonidovich Kurochkin, Moscow (RU); Roman Pavlovich Ermakov, Moscow (RU); Vladimir Vladimirovich Zavodilenko, Moscow (RU); Anton Vadimovich Losev, Moscow (RU); Alexander Victorovich Udaltsov, Moscow (RU); Violetta Vladimirovna Sharoglazova, Moscow (RU); Roman Alexeevich Shakhovoy, Moscow (RU); Yury Vladimirovich Kurochkin, Moscow (RU)

(73) Assignee: QRATE LLC, Skolkovo (RU)

(*) Notice: Subject to any disclaimer, the term of this patent is extended or adjusted under 35 U.S.C. 154(b) by 219 days.

(21) Appl. No.: 16/540,106

(22) Filed: Aug. 14, 2019

(65) Prior Publication Data
US 2021/0034739 A1    Feb. 4, 2021

(30) Foreign Application Priority Data

Jul. 31, 2019  (RU) .......................... RU2019124324

(51) Int. Cl.
*G06F 21/55*  (2013.01)
*G06F 7/58*   (2006.01)
*H04L 9/08*   (2006.01)

(52) U.S. Cl.
CPC ............ *G06F 21/552* (2013.01); *G06F 7/588* (2013.01); *G06F 2221/034* (2013.01); *H04L 9/0852* (2013.01)

(58) Field of Classification Search
CPC ........ G06F 21/552; G06F 7/588; H04L 9/0852
See application file for complete search history.

(56) References Cited

U.S. PATENT DOCUMENTS

| | | | |
|---|---|---|---|
| 8,693,685 B2 * | 4/2014 | Tapster | H04L 9/0858 380/255 |
| 9,554,738 B1 * | 1/2017 | Gulati | A61B 5/0075 |
| 9,772,238 B2 * | 9/2017 | Preston | G01L 1/242 |
| 9,819,418 B2 * | 11/2017 | Nordholt | H04B 10/501 |
| 10,291,399 B2 * | 5/2019 | Nordholt | H04L 9/0852 |
| 2019/0154439 A1 * | 5/2019 | Binder | G01S 15/08 |
| 2020/0294401 A1 * | 9/2020 | Kerecsen | G05D 1/0287 |

* cited by examiner

*Primary Examiner* — Lynn D Feild
*Assistant Examiner* — Viral S Lakhia
(74) *Attorney, Agent, or Firm* — Bardmesser Law Group

(57) ABSTRACT

A system for random number generation includes a laser pulse driver; a laser diode emitting laser pulses; a fiber-optic unbalanced interferometer transforming laser radiation phase noise into amplitude modulation; an optical circulator/isolator that is used to prevent unwanted feedback into a laser cavity; a photodetector that detects the laser pulses from the interferometer; a digitizer that digitizes an output of the photodetector; a statistics control (SC) block that is used to calculate the probability density of the photodetector's output and to define a parameter $\Gamma$ that is related to a classical-to-quantum noise ratio and allows estimating random operation and providing attack resistance of the system; and a processor that receives the digitized output from the digitizer and outputs a true random bit sequence.

14 Claims, 5 Drawing Sheets ical QRNGs may provide very high rates of random bit generation. In fact, significant research efforts are focused nowadays on increasing the random bit rate by improving existing optical schemes and/or developing new post processing algorithms.
ATTACK-RESISTANT QUANTUM RANDOM NUMBER GENERATOR BASED ON THE INTERFERENCE OF LASER PULSES WITH RANDOM PHASE

CROSS REFERENCE TO RELATED APPLICATIONS

This application claims priority to RU 047549, filed on Jul. 31, 2019 (registration no. RU 2019124324), which is incorporated herein by reference in its entirety.

BACKGROUND OF THE INVENTION

Field of Invention

The present invention relates to the field of random number generators (RNGs), in particular to a quantum RNG (QRNG) based on interference of laser pulses with random phase.

Description of the Related Art

Random numbers constitute an important part of all contemporary cryptographic systems and their everyday applications, such as mobile communications, non-cash payments, emailing, internet-banking, cryptocurrency, blockchain networks, etc. Overwhelmingly, these applications use computer algorithms for generating random numbers. Since such algorithms are deterministic in nature, resulting bit sequences are not truly random and therefore potentially vulnerable for various attacks. Emerging quantum computers could make pseudo-randomness-based cryptographic systems completely defenseless; therefore, much attention is paid today to quantum key distribution (QKD) or "quantum cryptography" systems, where true random numbers take a special place.

In true RNGs, some physical source of entropy is used instead of a computer algorithm. Physical RNGs can be divided into two large groups: 1) RNGs using classical noise as the entropy source, and 2) RNGs based on the measurement of some quantum process. In the first case, unpredictability of the physical quantity is related to a huge number of parameters of a physical system and to their complex dependence on external conditions. In case of QRNGs, unpredictability of a physical quantity is based on the probabilistic nature of quantum phenomena. Therefore, the difference between classical and quantum RNGs is that the former are fundamentally deterministic (setting a sufficient number of initial conditions and knowing a sufficiently complete physical model of the process will make it possible to predict, at least in principle, the behavior of the system), whereas the latter are fundamentally non-deterministic by virtue of the laws of quantum mechanics.

Over the past decades, numerous QRNG schemes based on different quantum effects have been proposed [1]; however, most modern QRNGs use various methods of quantum optics. Indeed, semiconductor laser diode radiation is very convenient source of quantum randomness. Moreover, optical QRNGs may provide very high rates of random bit generation. In fact, significant research efforts are focused nowadays on increasing the random bit rate by improving existing optical schemes and/or developing new post processing algorithms.

A number of optical QRNGs uses phase noise of laser radiation as the entropy source. Such QRNGs could be divided into two groups characterized by continuous [2-4] and pulsed [5, 6] mode operation of a laser. Schemes based on the cw (continuous wave) lasing demonstrate slower generation of random numbers than QRNGs employing interference of pulses; therefore, the latter are more promising for applications requiring high bit rate, in particular for QKD.

The arrangement with the interference of laser pulses was first proposed by M. Jofre et al. [5] In this scheme, the train of laser pulses entered into the unbalanced Mach-Zehnder interferometer, whose delay line was chosen in such a way that the corresponding delay time was a multiple of the pulse repetition period, so that the first laser pulse interfered, e.g., with the third one, the second pulse interfered with the forth one, etc. An important requirement for the operation of such a scheme is that the laser should be modulated over the lasing threshold, i.e., after each pulse the laser should be switched to the amplified spontaneous emission (ASE) regime. Since most transitions in the ASE regime are spontaneous, any phase correlations of the electromagnetic field are destroyed very quickly. As a result, each new laser pulse appears with a random phase. C. Abellán et al. demonstrated that even with a pulse repetition rate of more than 5 GHz the phases of subsequent laser pulses from the distributed feedback (DFB) laser are truly random. Such high pulse repetition rate allowed reaching a random bit rate up to 42 Gbps [6].

The main drawback of fast optical QRNGs is their high price. In fact, all proposed implementations known to the inventors require expensive polarization-maintaining (PM) optical fiber components and high-priced fast analog-to-digital converters (ADCs). Moreover, raw random sequences are subject to complex post-processing procedures of randomness extraction, which also require quite expensive processing components, such as complex programmable logic devices (CPLDs) or field-programmable gate arrays (FPGAs). This partly explains the absence of fast (>1 Gbps) optical QRNGs on the market. Therefore, there is a need for both fast and inexpensive optical QRNG. There are several ways to reduce the price of the end-product: 1) to modify the optical scheme to get rid of expensive PM components, 2) to exclude the use of high-priced ADC, 3) to simplify the post-processing.

Another important requirement, which is crucial for cryptographic applications, is that QRNG should be resistant to various attacks from an adversary. Attack here does not mean a cryptoanalytic algorithm (in fact, by definition, any QRNG is invulnerable to this kind of attack). Here, an attack means some physical impact, that could change the state of the QRNG from its normal operation to some predictable state without the user being aware of it. So, in addition to be low-priced, QRNG should be also attack-resistant.

SUMMARY OF INVENTION

The invention relates to a fast attack-resistant quantum random number generator, that substantially obviates one or more disadvantages of the related art.

In one aspect, a system for random number generation includes a laser pulse driver; a laser diode emitting laser pulses; a Michelson interferometer formed by a fiber-optic coupler/splitter connected to a first Faraday mirror through a single mode fiber of length L+ΔL, and to a second Faraday mirror through a single mode fiber of length L; a circulator or optical isolator that is used to prevent unwanted feedback into a laser cavity; a photodetector that detects the laser pulses from the interferometer; a digitizer that digitizes an output of the photodetector; a statistics control (SC) unit that is used to calculate the probability density of the photodetector's output; and a processor that receives the digitized output from the digitizer and outputs a random bit sequence (see FIG. 1). The SC unit includes, for example, a comparator or an Analog-To-Digital Converter combined with a sample-and-hold circuit. The length ΔL is selected so that a corresponding time delay Δt=nΔL/c is a multiple of a pulse repetition rate of the laser diode (here n is the refractive index of the optical fiber and c is the speed of light in vacuum).

In another aspect, a method for random number generation combined with an attack resistance procedure includes driving a laser diode to emit laser pulses; transforming laser radiation phase noise into amplitude modulation with an interferometer; detecting laser pulses from the interferometer using a photodetector; digitizing an output of the photodetector using a digitizer; calculating the probability density of the photodetector's signal; defining a parameter Γ that is related to a classical-to-quantum noise ratio and allows estimating correct operation of the device and providing attack resistance of the system; and processing the signals from the digitizer and the SC unit to perform self-tuning of the QRNG and to provide resistance to an attack.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

The invention is based on the extraction of random bits from the phase of laser pulses with on-the-fly signal check for the presence of possible influence of the adversary. The QRNG is designed to be simple and low-priced and represents an optimal solution for commercial production. Below, in the first subsection, we consider in detail the optical schematic, with the equations explaining our choice of the interferometer type. In the second subsection, we consider the issue related to the statistics of the random signal, which provides a key to the attack resistance Finally, in the last subsection, we describe the procedure that makes the QRNG attack-resistant and provides its self-tuning.

Optical Schematic

Figure 1:
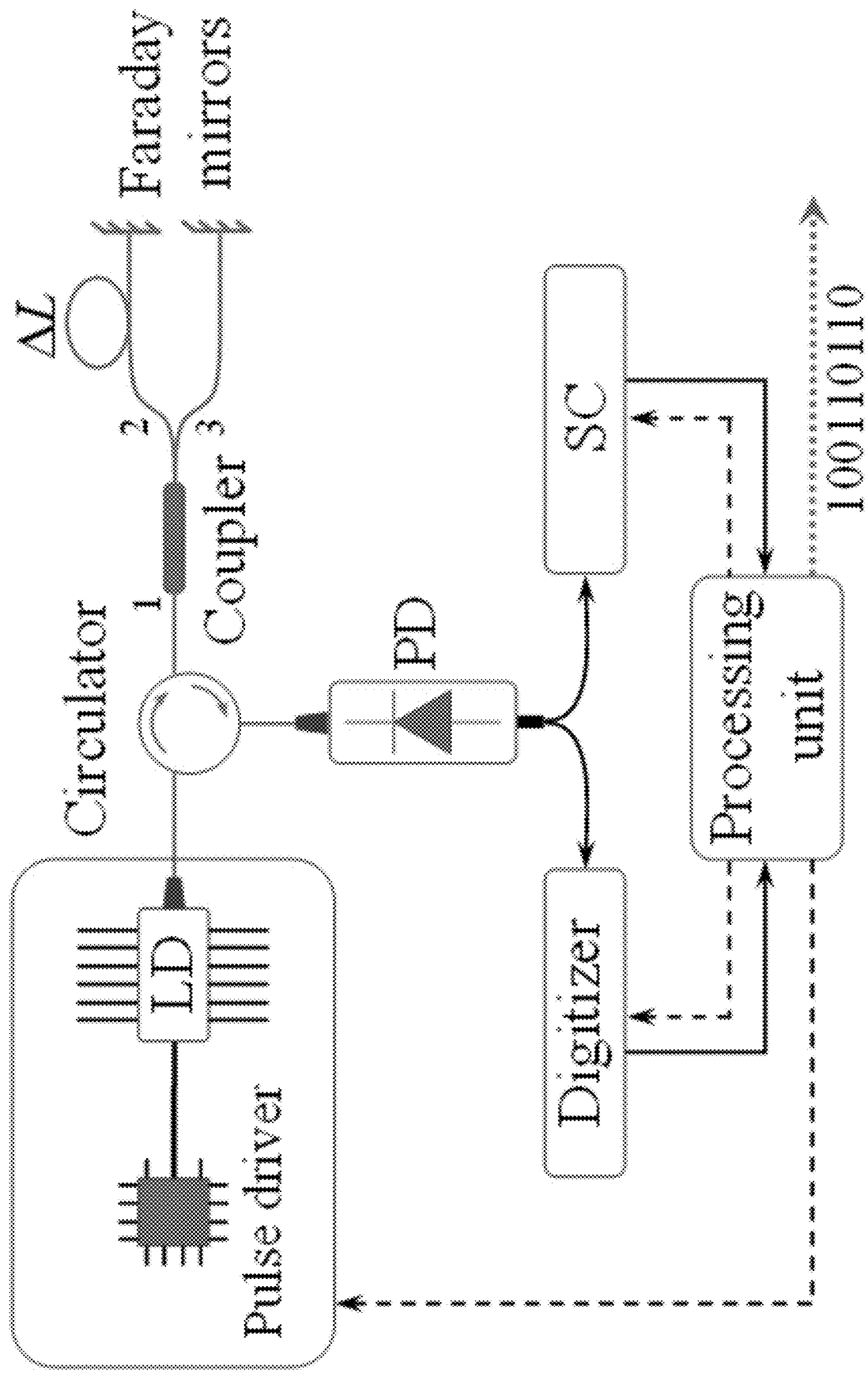
FIG. 1 shows the principle schematic of the QRNG: PD—photodetector, LD—laser diode, SC—statistics control unit.

The principal schematic of the proposed QRNG is shown in FIG. 1. The entropy source of the QRNG is the random phase of semiconductor laser radiation, which is converted to the amplitude modulation via the interference of laser pulses in the interferometer. The laser is modulated by the pulse driver over the lasing threshold and a continuous train of pulses is sent to the Michelson interferometer, where the delay time of the longer arm is chosen to be a multiple of the pulse repetition period. The photodiode then detects the interference of two pulses emitted by the laser at different moments of time and thus having random phases.

The interference of two laser pulses can be represented as the interference of two short bell-shaped beams meeting at the photodetector. Let us assume for simplicity that near the photodetector's input the amplitude $E_0$ of the electromagnetic field of a single pulse is defined by the Gaussian function of time t:

$$E_0(t) = \alpha \exp(-2\ln(2)t^2/w^2), \quad (1)$$

where α is a peak amplitude and w is a width (full width at half maximum—FWHM) of a pulse, i.e., its effective duration. Note that the width w of a pulse is determined experimentally by the intensity envelope of the signal, $I(t) = \langle E^2(t) \rangle_\tau$, rather than by the amplitude envelope of the electric field and thus w is $\sqrt{2}$ times smaller that the FWHM of the $E_0(t)$ function. (The angular brackets in the definition of I(t) stand for averaging over time τ, for which we require $\omega_0\tau \gg 1$ and $E_0(t+\tau) \approx E_0(t)$.) We assume also that the laser coherence time is much longer than the width of the pulse, i.e., the phase remains constant during time Δt~w. Finally, we will assume for a while that the polarization plane of the light in the pulse is maintained along the whole path.

Figure 2:
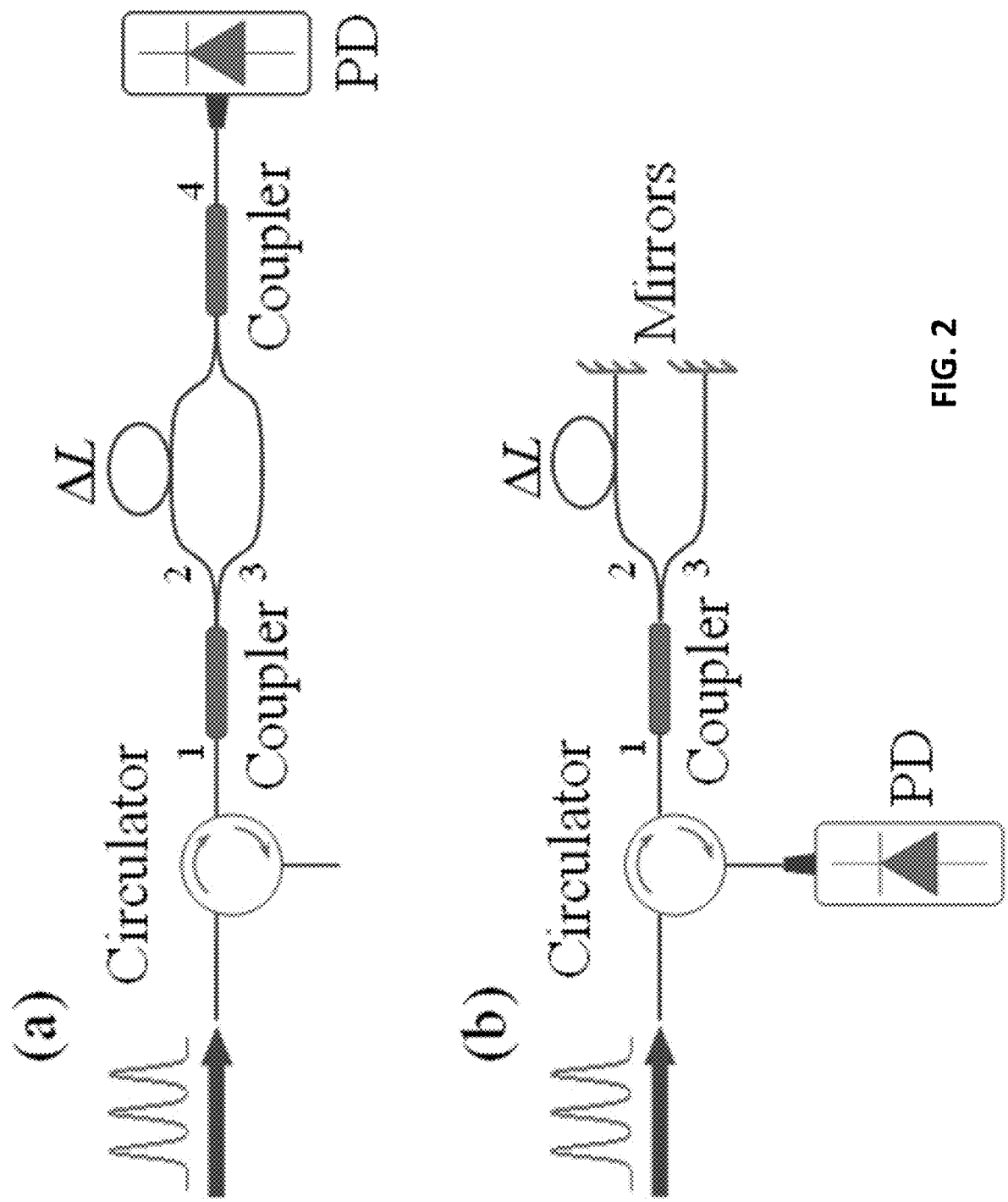
FIG. 2 shows the schematics of the Mach-Zehnder (a) and Michelson (b) fiber interferometers. ΔL denotes the delay line length.

Given the above, the intensity of the electric field of two interfering laser pulses can be written as follows:

$$I(t) = \langle [E_1(t) + E_2(t)]^2 \rangle_\tau = T_{12}T_{2j}E_{01}^2(t) + T_{13}T_{3j}E_{02}^2(t-\delta) + \quad (2)$$
$$2\sqrt{T_{12}T_{2j}T_{13}T_{3j}}\,\gamma(\delta)E_{01}(t)E_{02}(t-\delta)\cos\Delta\varphi =$$
$$I_1(t) + I_2(t-\delta) + 2\gamma(\delta)\sqrt{I_1(t)I_2(t-\delta)}\,\cos\Delta\varphi,$$

where $E_{1,2}(t) = E_{0(1,2)}(t)\cos(\omega_0 t + \varphi_{1,2})$ are electric fields of the laser pulses at the input of the photodetector, $\Delta\varphi = \varphi_2 - \varphi_1$ is the phase difference of the pulses, δ is a distance (on a timeline) between maxima of pulse envelopes, $T_{kl}$ is a coupler transmittance from the input port k to the output port l (see FIG. 2 to clarify subscripts). Equation (2) is written in a form suitable for both interference schemes: for the Mach-Zehnder interferometer j=4, whereas for the Michelson interferometer j=1 (see FIG. 2). Finally, γ(δ) is the normalized autocorrelation function defining the dependence of the interferometer's visibility on the spectral density of laser radiation:

$$\gamma(\tau) = \frac{\langle E^*(t)E(t-\tau)\rangle_t}{|E(0)|^2}, \quad (3)$$

where $\langle E^*(t)E(t-\tau)\rangle$, is the autocorrelation function of the electric field E in the interfering pulses (angular brackets stand for averaging over t).

Note that the phase of a pulse at the input of the photodetector can be written as $\varphi_p+\theta_p$, where $\varphi_p$ is the pulse phase just at the output of the laser and $\theta_p$ is the phase shift after the interferometer. Therefore $$\Delta\varphi=\varphi_{p2}+\theta_{p2}-\varphi_{p1}-\theta_{p1}=\Delta\varphi_p\Delta\theta, \quad (4)$$

where $\Delta\theta=\theta_{p2}-\theta_{p1}$ is the phase shift due to the delay line of the interferometer and $\Delta\varphi_p=\varphi_{p2}-\varphi_{p1}$.

Let us define the normalized integral signal corresponding to a given pair of interfering pulses as follows:

$$S = \frac{\int_{-\infty}^{+\infty} I(t)dt}{\int_{-\infty}^{+\infty} \exp\left(-\frac{4\ln(2)t^2}{w^2}\right)dt}. \quad (5)$$

Substituting (2) in (5) we obtain:

$$S=s_1+s_2+2\kappa\sqrt{s_1s_2}\cos\Delta\phi, \quad (6)$$

where $s_1=T_{12}T_{2f}\alpha_1^2$, $s_2=T_{13}T_{3f}\alpha_2^2$, and coefficient $$\kappa = \kappa_\delta = \gamma(\delta)e^{\frac{\ln(2)\delta^2}{w^2}} \quad (7)$$

defines visibility of the interferometer ($0\leq\kappa_\delta\leq 1$). Thus, if the delay line is chosen not quite correctly, i.e., interfering pulses overlap not exactly in the maxima ($\delta\neq 0$), then visibility becomes worse: $\kappa_\delta<1$.

So far, we assumed that interfering beams were plane polarized and that their polarization plane was maintained at each point of the beams' path. Such an assumption is valid only if the optical schematic uses polarization-maintaining (PM) fiber. If however one uses conventional single mode (SM) optical fiber, then one should take into account the effect of polarization mode dispersion (PMD). The latter leads to the fact that the light in the pulse ceases to be linearly polarized when propagating in the fiber and acquires elliptical polarization.

Let us consider briefly the interference of two laser beams with arbitrary polarization. Let there be two monochromatic electromagnetic waves propagating along the z-axis, whose electric vectors change over time as follows:

$$E_1(t) = \frac{e_x}{\sqrt{2}}E_{01}\cos(\omega_0 t+\zeta_1) + \frac{e_y}{\sqrt{2}}E_{01}\cos(\omega_0 t+\xi_1), \quad (8)$$

$$E_2(t) = \frac{e_x}{\sqrt{2}}E_{02}\cos(\omega_0 t+\zeta_2) + \frac{e_y}{\sqrt{2}}E_{02}\cos(\omega_0 t+\xi_2),$$

where $e_x$ and $e_y$ are unit vectors defining orientation of x and y axes, $\zeta_i$ is the phase of the x component of the i-th wave, $\xi_i$ is the phase of the y component of the i-th wave, $E_{0i}$ is the amplitude of the i-th wave. One can see from (8) that the interference of two monochromatic waves with arbitrary polarization is reduced to the interference of two pairs of monochromatic electromagnetic waves polarized along x and y axes, i.e.

$$E(t) = E_1(t) + E_2(t) = \frac{e_x}{\sqrt{2}}(E_{01}\cos(\omega_0 t+\zeta_1) + E_{02}\cos(\omega_0 t+\zeta_2)) + \quad (9)$$

$$\frac{e_y}{\sqrt{2}}(E_{01}\cos(\omega_0 t+\xi_1) + E_{02}\cos(\omega_0 t+\xi_2)).$$

It is easy to show that the amplitude of the resulting wave is defined by $$E_0^2=E_{01}^2+E_{02}^2+E_{01}E_{02}(\cos(\zeta_2-\zeta_1)+\cos(\xi_2\xi_1)). \quad (10)$$

If $E_1$ and $E_2$ are polarized in the same plane, i.e., $(\zeta_1-\xi_1=\zeta_2-\xi_2=\pi m$, where m is an integer, then $\cos(\zeta_2-\zeta_1)=\cos(\xi_2-\xi_1)$ and one can see from (10) that the waves will interfere in the usual way. If the waves are polarized in perpendicular planes, i.e., $\zeta_1-\xi_1=\zeta_2-\xi_2+\pi$, then $\cos(\zeta_2-\zeta_1)+\cos(\xi_2-\xi_1)=0$ and the waves will not interfere.

Let us show how PMD influences the interference of laser pulses. We assume that all pulses have the same polarization at the output of the laser and differ only in the initial phase $\varphi_p$, i.e.

$$\zeta_1=\xi_1=\varphi_{p1},$$

$$\zeta_2=\xi_2=\varphi_{p2}, \quad (11)$$

Further consideration will depend on the type of interferometer. We first consider the Mach-Zehnder interferometer. Due to the PMD, the x and y components of the electric field propagate in the fiber with different speeds, i.e., one should introduce two effective refractive indices $n_x$ and $n_y$. Moreover, one should take into account that different arms of the interferometer may be subject to different external factors, in other words, one should introduce two pairs of effective refractive indices, $n'_{x,y}$ and $n_{x,y}$, for the short and long arms, respectively. Then the propagation time of the polarization components along the short arm of the interferometer is $n'_{x,y}L/c$, whereas along the long arm is $n_{x,y}(L+\Delta L)/c$, where $\Delta L$ is the length of the delay line and c is the light speed in the vacuum. We then have, for the phases of the polarization components:

$$\zeta_1 = \varphi_{p1} + \omega_0\frac{Ln'_x}{c}, \quad (12)$$

$$\zeta_2 = \varphi_{p2} + \omega_0\frac{(L+\Delta L)n_x}{c},$$

$$\xi_1 = \varphi_{p1} + \omega_0\frac{Ln'_y}{c},$$

$$\xi_2 = \varphi_{p2} + \omega_0\frac{(L+\Delta L)n_y}{c}.$$

Substituting (12) into (10) we obtain for the cosine difference:

$$\cos(\zeta_2 - \zeta_1) + \cos(\xi_2 - \xi_1) = \qquad (13)$$
$$2\cos\left(\Delta\varphi_p + \frac{\omega_0 L}{2c}(n_x - n'_x + n_y - n'_y) + \frac{\omega_0 \Delta L}{2c}(n_x + n_y)\right) \times$$
$$\cos\left(\frac{\omega_0 L}{2c}(n_x - n'_x + n_y - n') + \frac{\omega_0 \Delta L}{2c}(n_x - n_y)\right) = 2\kappa_P \cos(\Delta\varphi),$$

where $$\Delta\varphi = \Delta\varphi_p + \frac{\omega_0 L}{2c}(n_x - n'_x + n_y - n'_y) + \frac{\omega_0 \Delta L}{2c}(n_x + n_y) \qquad (14)$$

and where a coefficient $\kappa_p$ was introduced $$\kappa_P = \cos\left(\frac{\omega_0 L}{2c}(n_x - n'_x + n_y - n') + \frac{\omega_0 \Delta L}{2c}(n_x - n_y)\right), \qquad (15)$$

defining the visibility of the interferometer related to the mismatch of polarizations in interfering pulses (let us call this magnitude the polarization-related visibility). If the effect of PMD is the same in both arms, i.e., one can put $n_{x,y} = n'_{x,y}$, then $$\Delta\varphi = \Delta\varphi_p + \frac{\omega_0 \Delta L}{2c}(n_x + n_y), \qquad (16)$$

and the coefficient $\kappa_p$ can be written in the following form:

$$\kappa_p = \cos(\tfrac{1}{2} k_{PMD}\omega_0 \Delta L), \qquad (17)$$

where $k_{PMD} = |n_x - n_y|/c = \Delta n/c$ is the PMD coefficient for short fiber. The $k_{PMD}$ coefficient can be estimated from known values of the PMD coefficient for long fiber, which for modern optical fibers has the order of 0.1 ps/√km. We can put then $k_{PMD} \sim 10^{-2}$ ps/m and assuming $\Delta L \sim 1$ m and $\omega_0/2\pi \approx 2\times 10^{14}$ Hz we have:

$$\tfrac{1}{2} k_{PMD}\omega_0 \Delta L \sim \pi. \qquad (18)$$

so $0 \le |\kappa_p| \le 1$. As a result, the phase shift due to the PMD effect can "rotate" the polarization of laser pulses so that they will not interfere. Therefore, $\kappa$ in (6) is $\kappa = \kappa_\delta \kappa_p$. This means that the visibility may differ significantly from unity even if $\delta \approx 0$, i.e., when interfering pulses ideally overlap.

A similar result is obtained for the Michelson interferometer with ordinary mirrors. The situation changes, however, if one uses Faraday mirrors. In this case the electric vectors of both polarization components, $E_x$ and $E_y$, rotate by 90 degrees after reflection, i.e., they are swapped. As a result, the "slow" component will become "fast" after reflection, so the phase shifts for both components will be the same at the output of the interferometer. This fact is clearly seen from the following equations:

$$\zeta_1 = \varphi_{p1} + \omega_0 \frac{Ln'_y}{c} + \omega_0 \frac{Ln'_x}{c}, \qquad (19)$$
$$\zeta_2 = \varphi_{p2} + \omega_0 \frac{(L+\Delta L)n_y}{c} + \omega_0 \frac{(L+\Delta L)n_x}{c},$$

-continued
$$\xi_1 = \varphi_{p1} + \omega_0 \frac{Ln'_x}{c} + \omega_0 \frac{Ln'_y}{c},$$
$$\xi_2 = \varphi_{p2} + \omega_0 \frac{(L+\Delta L)n_x}{c} + \omega_0 \frac{(L+\Delta L)n_y}{c}.$$

In fact, one can see from (19) that $\xi_2 - \xi_1 = \zeta_2 - \zeta_1$; consequently, the cosine difference in (10) will have the simple form: $2\cos(\Delta\varphi_p + \Delta\theta)$, where $$\Delta\theta = \frac{\omega_0(L+\Delta L)}{c}(n_x + n_y) - \frac{\omega_0 L}{c}(n'_x + n'_y). \qquad (20)$$

We may now conclude that for the QRNG optical scheme under consideration, the SM fiber cannot be used with the Mach-Zehnder interferometer due to a significant influence of the PMD effect. Therefore, to avoid using expensive PM fiber in the device, one should use the Michelson interferometer with Faraday mirrors.

Density Probability of the Random Signal

Experimentally, the source of entropy in the QRNG under consideration is the random signal S (Eq. (6)). The randomness of the signal arises from the randomness of the phase difference $\Delta\varphi$, whose density distribution is uniform in the range $[0;\pi)$ [6]. Taking into account that peak intensity of the laser pulses could also fluctuate, i.e., quantities $s_1$ and $s_2$ are also random, the cumulative distribution function of the signal S can be defined as follows:

$$F_s(Y) = \iiint_{S<y} \rho_{s_1}(x_1)\rho_{s_2}(x_2)\rho_{\Delta\varphi}(x_3)dx_1 dx_2 dx_3, \qquad (21)$$

where values of random variables $s_1$, $s_2$ и $\Delta\varphi$ are denoted as $x_1$, $x_2$ and $x_3$, respectively, y stands for the value of S, and an integration area is defined by the following inequality:

$$x_1 + x_2 + 2\kappa\sqrt{x_1 x_2}\cos x_3 < y. \qquad (22)$$

The probability density of the signal S is then defined simply by the derivative: $\rho_s(x) = F'_s(x)$.

Figure 3:
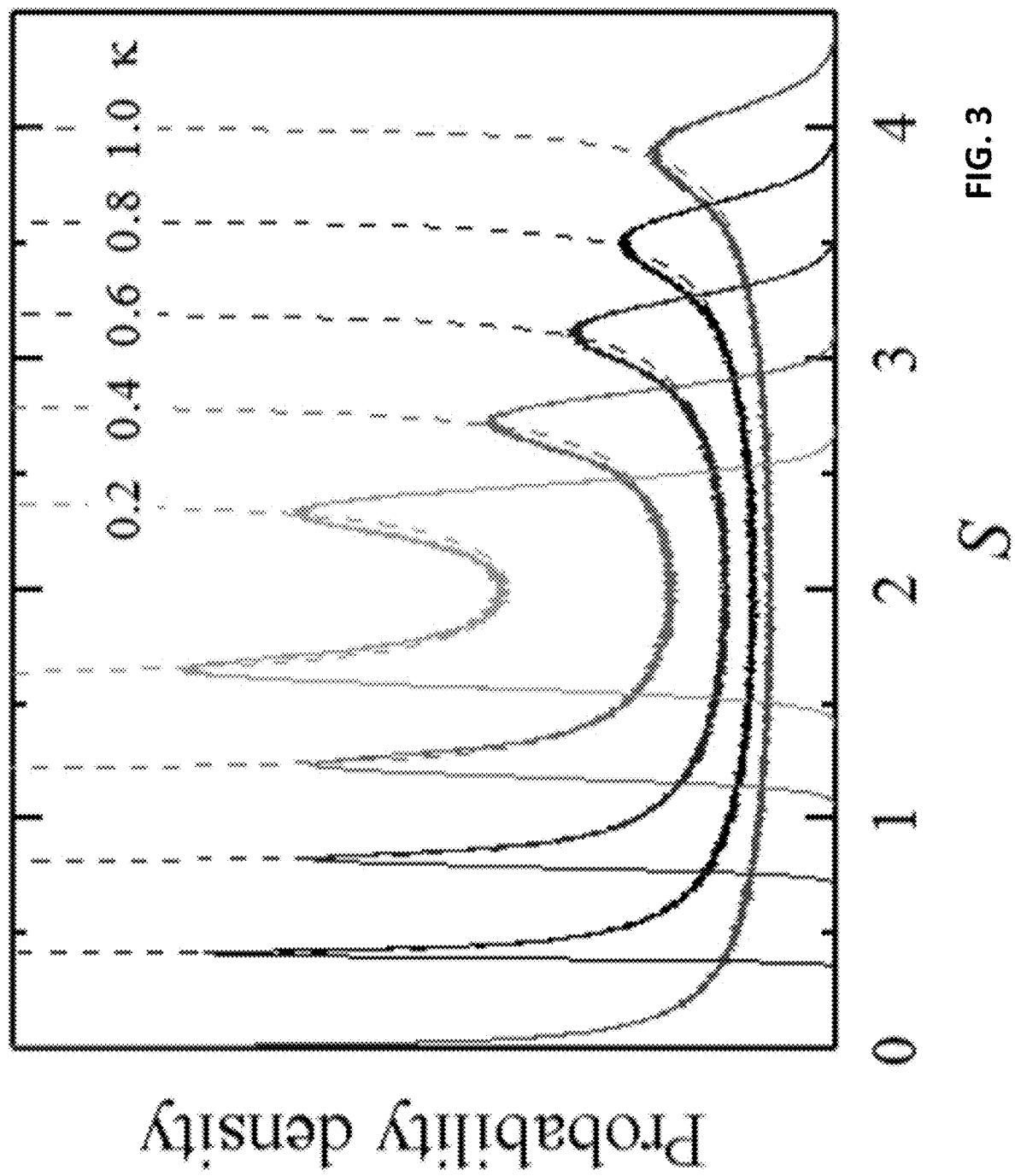
FIG. 3 shows a Monte-Carlo simulations of density distributions of the signal corresponding to the interference of laser pulses with random phase.

The form of $\rho_s(x)$ for different values of visibility $\kappa$ is shown in FIG. 3. The curves were obtained by Monte-Carlo simulations under the assumption that $s_1$ and $s_2$ have Gaussian distribution with standard deviations and mean values to be $\sigma_{s1} = \sigma_{s2} = 0.05$ and $\bar{s}_1 = \bar{s}_2 = 1$, respectively. Probability distribution of $\Delta\varphi$, in turn, was assumed to be uniform in the range $[0;\pi)$. Dashed lines in FIG. 3 correspond to the function $$\rho_s^{ideal}(x) = [\pi\sqrt{(x-S_{min})(S_{max}-x)}]^{-1}, \qquad (23)$$

which represents the density distribution of the signal S under the assumption that $s_1$ and $s_2$ do not exhibit fluctuations and where $$S_{min} = \bar{s}_1 + \bar{s}_2 - 2\kappa\sqrt{\bar{s}_1 \bar{s}_2},$$
$$S_{max} = \bar{s}_1 + \bar{s}_2 + 2\kappa\sqrt{\bar{s}_1 \bar{s}_2}. \qquad (24)$$

The distance between the asymptotes of the function $\rho_s^{ideal}(x)$ is $$S_{max} - S_{min} \equiv w_{\Delta\varphi} = 4\kappa\sqrt{\bar{s}_1 \bar{s}_2}, \qquad (25)$$

and we can treat it as the width of the distribution.

Due to the fact that variation of $\Delta\varphi$ is caused by quantum fluctuations of the laser phase and since (23) is derived by assuming that the only random variable in Eq. (6) is $\Delta\varphi$, we can consider the function $\rho_s^{ideal}(x)$ as the distribution of the quantum noise. Consequently, any deviation of actual (experimental) density distribution from the function $\rho_s^{ideal}(x)$ we will treat as the influence of classical noise. Moreover, real density distribution is additionally broadened due to the noise of photodetector itself and can be shifted due to "flare" arising from reflections in the optical elements. Therefore, the signal from the photodetector should be written as $$S' = S + \psi, \quad (26)$$

where $\psi$ is the classical Gaussian noise.

Attack Resistance

As noted above, the randomness source is perfectly unpredictable only if it has quantum nature. The classical noise, in turn, is not only fundamentally deterministic, but, more importantly, may be subject to external action from an adversary. Thus, with a strict approach, a truly random sequence can be obtained by discarding classical noise and using only the quantum component of the signal. However, it is physically impossible to separate classical and quantum noises, since the generation of electrical pulses for the laser as well as the detection of the optical signal is performed using classical devices. Therefore, one should estimate somehow the ratio $r_{QC}$, between quantum and classical noises. If this ratio is high enough, one can neglect contribution from classical fluctuations, and if the digitization of the signal does not introduce non-uniformity, one could use the raw random sequence. If, however, classical fluctuations cannot be neglected, and one should take into account possible impact of an adversary, who potentially has an access to the classical noise and could thus compromise a QRNG by introducing correlations to its output. The $r_{QC}$ ratio can be then considered as a measure of such correlations. So, one can assume that by removing these correlations with various randomness extractors (RE) (e.g., using a von Neumann extractor, or cryptographic hash function), one removes the contribution from classical fluctuations.

Quantum-to-classical noise ratio $r_{QC}$ has been estimated by a number of authors for various QRNGs [4, 7-9]. In their works, it was assumed that the noise signal from the photodetector contains classical and quantum contributions in a multiplicative form. With such an assumption the value of $r_{QC}$ can be estimated via the ratio of variances of classical and quantum noises, as was done in [4], or calculating the difference between Shannon entropies of quantum and classical signals, as was proposed in [7]. Unfortunately, for our QRNG the multiplicative noise model is not suitable and noises should be considered additively, as in Eq. (26). As a consequence, estimation of $r_{QC}$ in our case hardly seems possible; therefore, we proposed a different approach based on estimation of a so-called effective reduction factor related to conventional reduction factor usually used in RE procedures.

The RE procedure can be considered as the compression of the l-bit raw sequence (which is generally non-uniform) to the m-bit uniform sequence:

$$\{0, 1\}^l \xrightarrow{RE} \{0, 1\}^m, \quad (27)$$

where we can introduce the (conventional) reduction factor $\gamma$ as $$\gamma = \frac{l}{m}. \quad (28)$$

The factor $\gamma$ is usually estimated from the min-entropy of the raw sequence. Thus, from the sequence $\{X_1, X_2, \ldots, X_N\}$ with $N \gg 1$, where each $X_i$ is an n-bit word, one can extract $NH_{min}$ uniformly distributed bits, i.e., the raw bit sequence of the length $N \times n$ should be reduced by the factor of $\gamma = n/H_{min}$. The min-entropy, in turn, is defined as follows:

$$H_{min} = -\log_2 p_{max}, \quad (29)$$

where $p_{max}$ is the maximum probability to guess an element from the sequence $\{X_1, X_2, \ldots, X_N\}$.

The reduction factor depends on how the signal from the photodetector is digitized. Using an ADC, one should take into account that the signal will be more likely to fall into bins, corresponding to higher probability, i.e., the digitization of the signal with non-uniform density distribution automatically results in a non-uniform random sequence. In contrast, when digitizing the signal with a comparator, one should only set up the threshold voltage so that the number of zeroes and ones in the output sequence is the same. Indeed, taking into account the true randomness of the phase $\Delta\varphi$, we can consider the resulting bit sequence from the comparator to be truly random. Note that in such an implementation, only a single bit is extracted per one sample, i.e., the random bit generation rate is limited by the laser pulse repetition rate. Despite this limitation, use of the comparator seems to be very advantageous, since 1) it allows avoiding expensive ADCs, and 2) allows extracting random bits without a need to process them and thus without the reduction loss (assuming the classical noise is small).

The reduction factor $\gamma$ for the QRNG scheme with the comparator (n=1) can be defined simply as $\gamma = 1/H_{min}$. This definition however does not allow taking into account the presence of the classical noise in the photodetector signal. To include classical fluctuations into consideration, we introduce an effective reduction factor $\Gamma$ using the following method. First, we assume that the threshold voltage of the comparator $V_{th}$ corresponds to the center of the signal distribution, i.e., the areas under the $\rho_s(x)$ curve left and right of $V_{th}$ are equal. According to (23), we can write: $V_{th} = S_{min} + w_{\Delta\varphi}/2$, where $S_{min}$ and $w_{\Delta\varphi}$ are given by Eq. (24) and Eq. (25), respectively. Then, we define the quantum min-entropy as follows:

$$H_{min}^Q = -\log_2\left(\int_{S_{min}}^{S_{min}+w_{\Delta\varphi}/2} \rho_S^{ideal}(x)dx\right) = 1. \quad (30)$$

Note further that the density distribution of the signal S' (Eq. (26)) becomes broader when increasing the classical noise $\psi$. Due to this, the probability that the photodetector voltage falls into the "bin" from $S_{min}$ to $S_{min}+w_{\Delta\varphi}/2$ is smaller for the noisy signal than for the ideal quantum signal. Let us assume that if contributions from classical and quantum noises are the same, then the RNG ceases to be quantum and the effective reduction factor should be put to infinity: $\Gamma \to \infty$. In contrast, if classical fluctuations are negligibly small, then one can use the raw sequence, i.e., σ=1. Using this assumption, we can define the effective reduction factor as follows:

$$\Gamma = \frac{1}{2 - H_{min}}, \quad (31)$$

where $$H_{min} = -\log_2\left(\int_{S_{min}}^{V_{th}} \rho_{S'}(x)dx\right), \quad (32)$$

and where $\rho_{S'}(x)$ is the experimental density distribution of the signal from the photodetector. Obviously, if there is no classical noise, then $H_{min} = H_{min}^Q = 1$ and σ=1. If, however, classical min-entropy equals to quantum min-entropy, then $H_{min} = H_{min}^Q + H_{min}^C = 2H_{min}^Q = 2$, then σ→∞.

This approach can be easily extended to the case of the ADC. For this, note first that the density distribution $\rho_s(x)$ (FIG. 3) has a pronounced absolute maximum at $x=S_{min}$, so that $p_{max}$ will always correspond to the probability of the corresponding bin. Therefore, we can write for the effective reduction factor $$\Gamma = \frac{n}{2H_{min}^Q - H_{min}}, \quad (33)$$

where n is the resolution of the ADC in bits, and $$H_{min}^Q = -\log_2\left(\int_{S_{min}}^{S_{min}+\Delta u} \rho_S^{ideal}(x)dx\right), \quad (34)$$

$$H_{min} = -\log_2\left(\int_{S_{min}}^{S_{min}+\Delta u} \rho_{S'}(x)dx\right),$$

with the bin size $\Delta u = \Delta U/2^n$, where $\Delta U$ is the dynamic range of the ADC.

Since the value of the effective reduction factor reflects the contribution from classical fluctuations, the knowledge of Γ makes the QRNG resistant to an attack, which forges the classical noise. In other words, attack resistance is reduced to the on-the-fly calculation of Γ, which, in turn, requires the calculation of the min-entropy defined by Eq. (32). Since the integral in Eq. (32) contains the experimental density distribution $\rho_{S'}$, the main purpose of the statistics control (SC) block in FIG. 1 is to determine $\rho_{S'}$. We can propose at least two embodiments of such a block.

The first embodiment of the SC unit represents a high-speed comparator. In this case, the profile of the density distribution is restored using the threshold voltage sweep. For each value of $v_{th}$ we record the bit sequence of a specified length and calculate the ratio of ones and zeroes in the sequence: $R=N_{ones}/N_{zeroes}$. (To avoid confusion, we will use an upper case for the threshold voltage of the main comparator, $V_{th}$, and a lower case for the sweeping threshold voltage of the SC comparator, $v_{th}$.) One can easily show that if at two neighboring values of threshold voltage, $v_{th}^i$ and $v_{th}^{i+1}$, corresponding ratios of ones and zeroes are $R_i$ and $R_{i+1}$, respectively, then the value of the density distribution at $v_{th}^i$ can be calculated as follows:

$$\rho_{S'}(v_{th}^i) = \frac{|R_i - R_{i+1}|}{\Delta v(1 + R_i + R_{i+1} + R_i R_{i+1})}, \quad (35)$$

where $\Delta v$ is the voltage sweep step.

Figure 4:
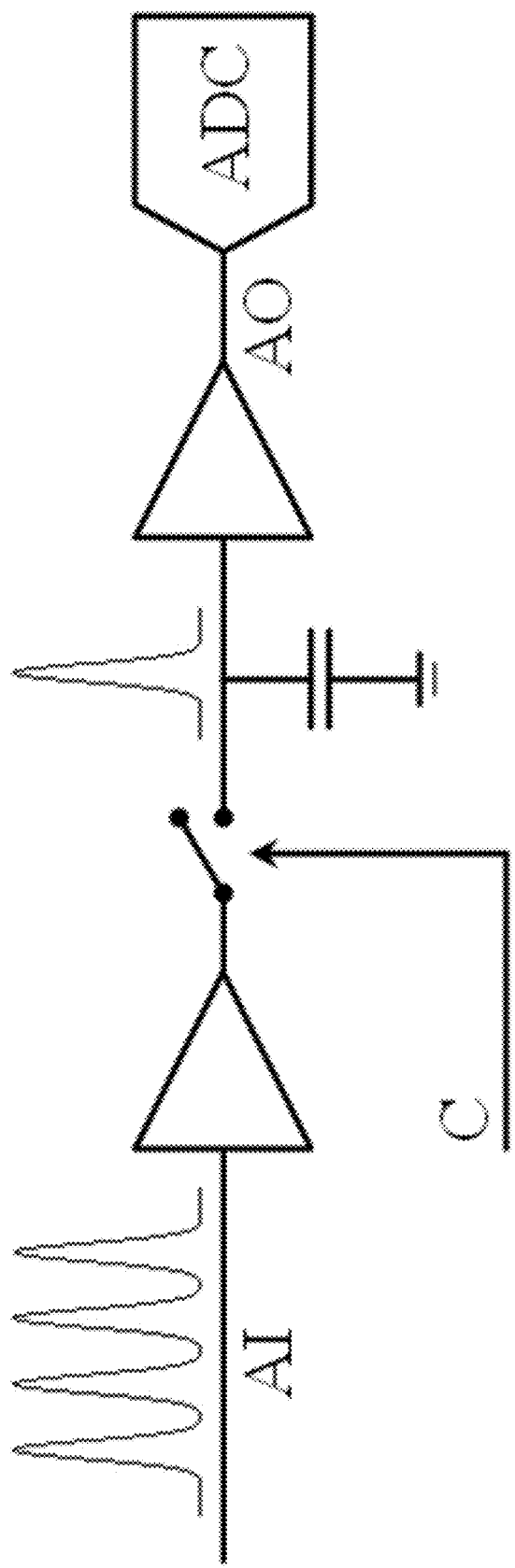
FIG. 4 shows an embodiment of the statistics control (SC) unit based on the low-speed ADC equipped with fast sample-and-hold circuit: AI—analog input, AO—analog output, C—control signal.

As the second embodiment, one can use a sample-and-hold circuit combined with a low-priced ADC (see FIG. 4). The low price assumes that the ADC operates at speeds up to several Msps, i.e., much lower than the pulse repetition rate. The point is that application of ultra high-speed (and expensive) ADC is absolutely impractical here. In fact, we deliberately avoid the use of the high-speed ADC, substituting the comparator for the ADC, and thus reducing the price of the end-product. The role of the sample-and-hold circuit in FIG. 4 is reduced to the regular sampling of a single pulse from the long pulse train. For this, the control signal in FIG. 4 opens the capacitor at a moment of time corresponding to the arrival of the pulse and then quickly closes it for a long time eliminating thus further variations in the input signal. Such "thinning" allows accumulating the statistics of the rapidly varying photodetector signal by slow ADC, i.e., allows finding $\rho_{S'}$. Obviously, this embodiment is more sophisticated than first implementation, so in some cases, the statistics control performed with the comparator might be preferred.

Finally, let us consider implementations of the attack protection. Depending on how it will be performed, we can propose two approaches for implementation of attack resistance and consequently two embodiments of the digitizer.

The first embodiment represents a single high-speed comparator, the threshold voltage for which is calculated using the previously found experimental density distribution $\rho_{S'}$. The raw bit sequence from the comparator is then subject to RE procedure (e.g., to hashing) performed in the processing unit, which uses the previously calculated value of Γ as a RE reduction factor.

As a second embodiment, one can use a pair of comparators whose threshold voltages are set to $V_{th}-\Delta V$ and $V_{th}+\Delta V$, respectively, where $\Delta V=V_\Gamma-V_{th}$, and $V_\Gamma$ is defined by the following equation:

$$\int_{V_{th}}^{V_\Gamma} \rho_{S'}(x)dx = \frac{\Gamma - 1}{2\Gamma}. \quad (36)$$

The signals from two comparators, $c_1$ and $c_2$, are then added modulo 2, and if $c_1 \oplus c_2=0$, then the processing unit buffers $c_1$ or $c_2$ (either one of them, since they are the same in this case). If, however, $c_1 \oplus c_2=1$, then nothing is written to the buffer. In fact, if the photodetector's output falls near the center of its density distribution, then there is a high probability that the output from a single comparator is controlled by an intruder, who can control the signal level in the range defined by the width of the classical noise. Therefore, to avoid intrusion of an adversary, one should discard signals corresponding to some region near $V_{th}$. The width of such a region should be guaranteed to be larger than the width of classical fluctuations. According to the definition of Γ, such requirement is satisfied, if the width of this region is $2\Delta V$.

Note that the embodiment with two comparators is conceptually similar to the case where untrusted bits are discarded via the RE procedure. In fact, by dropping the signal that falls into the range from $V_{th}-\Delta V$ to $V_{th}+\Delta V$, one "compresses" the raw bit sequence (applies a randomness extractor) by using hardware. However, such an implementation should work faster than hashing; therefore, in some cases it might be preferred.

Figure 5:
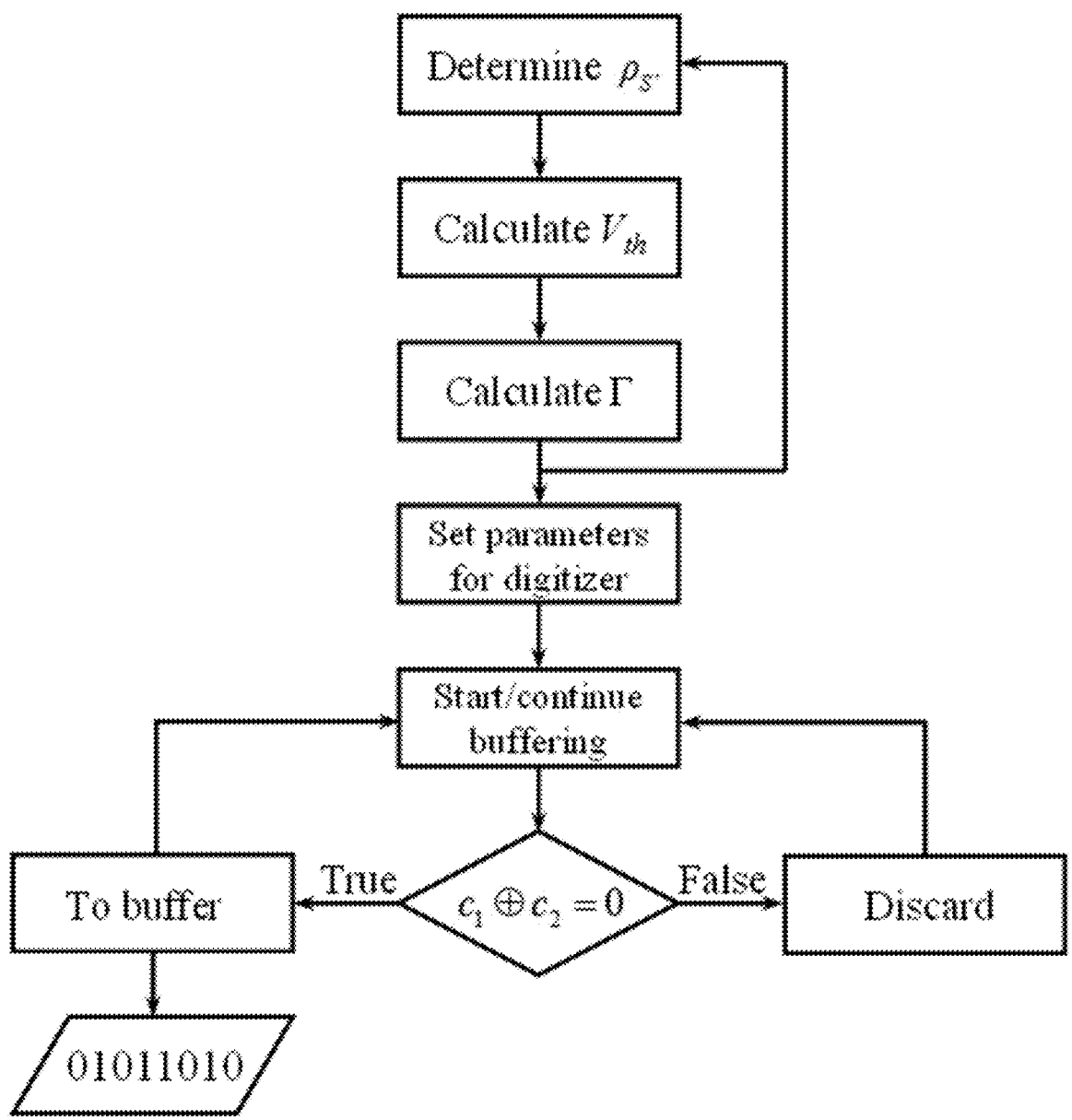
FIG. 5 shows a flowchart explaining the working cycle of the QRNG.

Summarizing the above, we can represent the working process of the QRNG by the simplified flowchart diagram shown in FIG. 5. (We assume here that the statistics controller is implemented via a comparator with sweeping threshold voltage, and the digitizer is implemented in the form of a pair of comparators.) We assume first that the laser continuously generates short pulses at specified repetition rate. The working cycle of the QRNG starts with the calculation of $\rho_{S'}$ using Eq. (35) (the upper block on the diagram). For this, one should specify the step $\Delta v$ of the threshold voltage sweep and the number of bits that will be used to find ratio of ones and zeroes at each value of $v_{th}$. Calculated density distribution is then saved as an array in the memory of the processing unit. The next block of the flowchart corresponds to the calculation of $V_{th}$, which is defined such that the areas under $\rho_{S'}$ left and right of $V_{th}$ are equal. Then the effective reduction factor $\Gamma$ is calculated using Eqs. (31) and (32). Knowing $\Gamma$ and $V_{th}$ the system calculates $V_{\Gamma}$ and set threshold voltages for a pair of comparators constituting the digitizer. In parallel, the system again starts calculating $\rho_{S'}$, $V_{th}$ and $\Gamma$ performing thus the on-the-fly control of the QRNG operation. Afterwards, the processing unit starts buffering random bits checking for each sample the result of the XOR operation of digital signals from the comparators and discarding the samples for which $c_1 \oplus c_2 = 1$.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

REFERENCES (all Incorporated Herein By Reference In Their Entirety)

[1] M. Herrero-Collantes and J. C. Garcia-Escartin, "Quantum random number generators," *Rev. Mod. Phys.*, vol. 89, p. 015004, 2017.
[2] H. Guo, W. Tang, Y. Liu, and W. Wei, "Truly random number generation based on measurement of phase noise of a laser," *Phys. Rev. E*, vol. 81, p. 051137, 2010.
[3] B. Qi, Y.-M. Chi, H.-K. Lo, and L. Qian, "High-speed quantum random number generation by measuring phase noise of a single-mode laser," *Opt. Lett.*, vol. 35, pp. 312-314, 2010.
[4] F. Xu, B. Qi, X. Ma, H. Xu, H. Zheng, and H.-K. Lo, "Ultrafast quantum random number generation based on quantum phase fluctuations," *Opt. Express*, vol. 20, pp. 12366-12377, 2012.
[5] M. Jofre, M. Curty, F. Steinlechner, G. Anzolin, J. P. Tones, M. W. Mitchell, and V. Pruneri, "True random numbers from amplified quantum vacuum," *Opt. Express*, vol. 19, pp. 20665-20672, 2011.
[6] C. Abellán, W. Amaya, M. Jofre, M. Curty, A. Acín, J. Capmany, V. Pruneri, and M. W. Mitchell, "Ultra-fast quantum randomness generation by accelerated phase diffusion in a pulsed laser diode," *Opt. Express*, vol. 22, pp. 1645-1654, 2014.
[7] C. Gabriel, C. Wittmann, D. Sych, R. Dong, W. Mauerer, U. L. Andersen, C. Marquardt, and G. Leuchs, "A generator for unique quantum random numbers based on vacuum states," *Nat. Photonics*, vol. 4, p. 711, 2010.
[8] X. Ma, F. Xu, H. Xu, X. Tan, B. Qi, and H.-K. Lo, "Postprocessing for quantum random-number generators: Entropy evaluation and randomness extraction," *Phys. Rev. A*, vol. 87, p. 062327, 2013.
[9] F. Raffaelli, P. Sibson, J. E. Kennard, D. H. Mahler, M. G. Thompson, and J. C. F. Matthews, "Generation of random numbers by measuring phase fluctuations from a laser diode with a silicon-on-insulator chip," *Opt. Express*, vol. 26, pp. 19730-19741, 2018.

What is claimed is:

1. A system for random number generation, comprising:
a laser diode driven by a laser pulse driver to emit laser pulses;
a fiber-optic unbalanced interferometer transforming laser radiation phase noise into amplitude modulation, wherein a delay line of the interferometer $\Delta L$ is selected so that a corresponding time delay $\Delta t = n\Delta L/c$ is a multiple of a pulse repetition rate of the laser diode, and wherein n is a refractive index of the single mode fiber and c is a speed of light in vacuum;
a photodetector that detects the laser pulses from the interferometer;
a digitizer that digitizes an output of the photodetector;
a statistics controller that calculates a probability density of the output of the photodetector; and
a processor that receives the digitized output from the digitizer and outputs a true random bit sequence based on a parameter F that allows estimating random operation.

2. The system of claim 1, wherein the statistics controller includes a comparator.

3. The system of claim 1, wherein the statistics controller includes an Analog-To-Digital Converter combined with a sample-and-hold circuit.

4. The system of claim 1, wherein the digitizer includes a single high-speed comparator.

5. The system of claim 1, wherein the digitizer includes a pair of high-speed comparators.

6. The system of claim 1, wherein the fiber-optic coupler/splitter is a single mode coupler/splitter that does not maintain polarization.

7. The system of claim 1, wherein the interferometer is a Michelson interferometer.

8. The system of claim 1, further comprising a circulator that prevents feedback into the laser diode.

9. A method for random number generation, comprising:
driving a laser diode to emit laser pulses;
transforming laser radiation phase noise into amplitude modulation by using an interferometer, wherein a delay line of the interferometer $\Delta L$ is selected so that a corresponding time delay $\Delta t = n\Delta T/c$ is a multiple of a pulse repetition rate of the laser diode, and wherein n is a refractive index of the single mode fiber and c is a speed of light in vacuum;
detecting laser pulses from the interferometer using a photodetector;
digitizing an output of the photodetector using a high-speed comparator/pair of comparators;
calculating a probability density of an output of the digitizer;
defining a parameter F that is related to a classical-to-quantum noise ratio and allows estimating random operation; and processing the output from the digitizer and from a statistics controller, so as to perform self-tuning of the random number generation and to detect physical attacks.

10. The method of claim 9, wherein the statistics controller uses a comparator.

11. The method of claim 9, wherein the statistics controller uses an Analog-To-Digital Converter combined with a sample-and-hold circuit.

12. The method of claim 9, wherein the fiber-optic coupler/splitter is a single mode coupler/splitter that does not maintain polarization.

13. The method of claim 9, wherein the interferometer is a Michelson interferometer.

14. The method of claim 9, wherein a circulator prevents feedback into the laser diode.

* * * * *